(12) United States Patent
Zhao et al.

(10) Patent No.: US 12,297,548 B2
(45) Date of Patent: May 13, 2025

(54) HYDROGEN EVOLUTION REACTION CATALYST

(71) Applicants: NEWSOUTH INNOVATIONS, PTY LIMITED, Sydney (AU); KOHODO HYDROGEN ENERGY PTY LTD, Sydney (AU)

(72) Inventors: Chuan Zhao, Sydney (AU); Yibing Li, Sydney (AU)

(73) Assignee: NEWSOUTH INNOVATIONS PTY LIMITED, Sydney (AU)

(*) Notice: Subject to any disclaimer, the term of this patent is extended or adjusted under 35 U.S.C. 154(b) by 439 days.

(21) Appl. No.: 17/289,566

(22) PCT Filed: Oct. 29, 2019

(86) PCT No.: PCT/AU2019/051187
§ 371 (c)(1),
(2) Date: Apr. 28, 2021

(87) PCT Pub. No.: WO2020/087115
PCT Pub. Date: May 7, 2020

(65) Prior Publication Data
US 2022/0010440 A1    Jan. 13, 2022

(30) Foreign Application Priority Data
Oct. 29, 2018 (AU) ................ 2018904084

(51) Int. Cl.
*C25B 11/091* (2021.01)
*C25B 1/04* (2021.01)
*C25D 3/54* (2006.01)

(52) U.S. Cl.
CPC .............. *C25B 11/091* (2021.01); *C25B 1/04* (2013.01); *C25D 3/54* (2013.01)

(58) Field of Classification Search
CPC ...... B01J 23/22; B01J 23/847–23/8472; C25B 1/02
See application file for complete search history.

(56) References Cited

U.S. PATENT DOCUMENTS

2010/0021776 A1* 1/2010 Dougherty .......... H01M 4/0438
                                                                   205/333
2013/0118912 A1    5/2013 Reece et al.

FOREIGN PATENT DOCUMENTS

JP    S55100987 A    8/1980
JP    S5633490 A     4/1981
(Continued)

OTHER PUBLICATIONS

Xing et al ("Cobalt vanadate as highly active, stable, noble metal-free oxygen evolution electrocatalyst", J. Mater. Chem. A, 2014, 2, pp. 18435-18443). (Year: 2014).*

(Continued)

*Primary Examiner* — Alexander W Keeling
(74) *Attorney, Agent, or Firm* — Carter, DeLuca & Farrell LLP

(57) ABSTRACT

The invention relates to a catalyst for the hydrogen evolution reaction (HER) and methods for using the catalyst in a water-splitting process. The invention also provides a composition, a material and an electrode comprising the catalyst. In particular, the invention relates to a hydrogen evolution reaction (HER) catalyst comprising a catalytic metal species comprising an active catalyst species and a vanadium species; wherein the catalytic metal species and the vanadium species are interspersed within the HER catalyst.

15 Claims, 9 Drawing Sheets

(56) References Cited

FOREIGN PATENT DOCUMENTS

JP          S59100279 A      6/1984
WO          2016011342 A1    1/2016

OTHER PUBLICATIONS

Li et al ("High-performance Cu-doped vanadium oxide (CuxV2O5) prepared by rapid precipitation method for rechargeable batteries", Materials Letters, vol. 61, Issue 1, Jan. 2007, pp. 101-104) (Year: 2007).*

International Search Report dated Dec. 13, 2019, corresponding to counterpart International Application No. PCT/AU2019/051187; 4 pages.

Written Opinion of the International Searching Authority, dated Dec. 13, 2019, corresponding to counterpart International Application No. PCT/AU2019/051187; 5 pages.

Ke Fan et al., "Nickel-vanadium monolayer double hydroxide for efficient electrochemical water oxidation," Nature Communications, Jun. 16, 2016; pp. 1-9.

Yinglu et al., "Cobalt-vanadium bimetal-based nanoplates for efficient overall water splitting," Science China Materials, Jan. 2018, vol. 61, No. 1; pp. 80-90.

Manilevich, F. D., et al., "Regularities of hydrogen evolution on steel cathodes covered with galvanic nickel coatings containing vanadium-pentoxide inclusions," Protection of Metals and Physical Chemistry of Surfaces, Mar. 2014, pp. 178-182, 50.

Sun, Qiangqiang, et al., "Bifunctional copper-doped nickel catalysts enable energy-efficient hydrogen production via hydrazine oxidation and hydrogen evolution reduction," Acs Sustainable Chemistry & Engineering, Aug. 2018, pp. 12746-12754, 6.10.

English Translation of Japanese Office Action for application No. 2021547602, Aug. 14, 2023, 12 pages.

English Translation of Chinese Office Action for application No. 201980072014.5, Mar. 22, 2024, 11 pages.

\* cited by examiner

HYDROGEN EVOLUTION REACTION CATALYST

CROSS-REFERENCE TO RELATED APPLICATIONS

This application is a national phase entry under 35 U.S.C. 371 of PCT International Application PCT/AU2019/051187 filed Oct. 29, 2019, which claims priority to Australian Patent Application No. 2018904084, filed Oct. 29, 2018, the disclosure of each of these applications is expressly incorporated herein by reference in their entirety.

FIELD OF THE INVENTION

The invention relates to a catalyst for the hydrogen evolution reaction (HER) and methods for using the catalyst in a water-splitting process. The invention also provides a composition, a material and an electrode comprising the catalyst.

BACKGROUND

Water-splitting processes are considered a sustainable approach to hydrogen generation and storage as they can exploit the abundance of available water and low carbon intensive energy source, such as a renewable source of energy (e.g. solar energy), as inputs. Water-splitting may be carried out in an electrolyser generating hydrogen at the cathode via the hydrogen evolution reaction (HER). Oxygen may be generated at the anode via the oxygen evolution reaction (OER). The current focus is on preparing catalysts for hydrogen evolution as hydrogen is more readily used as a fuel for a variety of applications, such as fuel cells.

Pt-based catalysts (e.g. Pt/C) are currently the primary option for cathode materials in water electrolysers due to the extremely low overpotential ($\eta$) at the onset of hydrogen evolution and large current densities (j). However, Pt-based HER catalysts are not suitable for large-scale applications as they are costly and their supply is not sustainable.

Recent efforts have focused on developing water-splitting catalysts based on Earth-abundant metals. Earth-abundant metals exclude Re, Ru, Os, Rh, Ir, Pd, Pt, Ag and Au.

Nickel cathodes have been shown to effectively catalyse HER. However, nickel cathodes suffer from instability with formation of a passivating cathode layer. Some reports have shown that inclusion of vanadium oxide ($V_2O_5$) in the electrolyte solution can arrest the passivation of nickel cathodes. Over time vanadium oxide deposits form on the surface of the nickel cathode.

There is a continuing need to provide alternative HER catalysts. In particular, there is a need to develop catalysts based on Earth-abundant transition metal(s).

SUMMARY OF THE INVENTION

The invention is predicated, at least in part, on the discovery that catalysts comprising a metal catalyst species (e.g. Ni or Co) interspersed with a vanadium species, increase the HER catalytic activity of the metal catalyst material. Further, the passivation of the metal catalyst species is also prevented. Surprisingly, the vanadium-doped catalysts of the invention also demonstrate strong HER catalytic activity in alkaline and neutral solutions.

In one aspect, the invention provides a hydrogen evolution reaction (HER) catalyst comprising:

a catalytic metal species comprising an active catalyst species; and
a vanadium species,
wherein the catalytic metal species and the vanadium species are interspersed within the HER catalyst.

In another aspect, the invention provides a catalytic material comprising the HER catalyst described herein and a substrate.

In a further aspect, the invention provides an electrode comprising a conductive substrate and the HER catalyst described herein. The HER catalyst is typically coated (e.g. by electrodeposition) onto a surface of the conductive substrate.

In yet another aspect, the invention provides a process for preparing the HER catalyst described herein, the catalytic material described herein and/or the electrode described herein, the process comprising contacting a conductive substrate with a solution comprising a source of a metal catalyst species and a source of a vanadium species, and applying a voltage across the substrate and a counter electrode through the solution to electrodeposit the metal catalyst species and the vanadium species onto a surface of the conductive substrate.

In a still further aspect, the invention provides a method of evolving hydrogen from water, the method comprising providing an electrochemical cell comprising at least two electrodes and an electrolyte solution, contacting water with the at least two electrodes, and applying a voltage across the at least two electrodes, wherein at least one of the at least two electrodes comprises the HER catalyst described herein, the catalytic material described herein or the electrode described herein.

In another aspect, the invention provides an electrolyser comprising at least two electrodes and a power supply, wherein at least one of the at least two electrodes comprises the HER catalyst of the invention.

Before describing the present invention in detail, it is to be understood that this invention is not limited to particularly exemplified embodiments, methods of production or use, which may, of course, vary.

The inventions described and claimed herein have many attributes and embodiments including, but not limited to, those set forth or described or referenced in this summary section, which is not intended to be all-inclusive. The inventions described and claimed herein are not limited to or by the features or embodiments identified in this summary section, which is included for purposes of overview illustration only and not limitation.

All publications, patents and patent applications cited herein, whether supra or infra, are hereby incorporated by reference in their entirety.

It is to be understood that, if any prior art publication is referred to herein, such reference does not constitute an admission that the publication forms a part of the common general knowledge in the art.

BRIEF DESCRIPTION OF DRAWINGS

The present application will be further described, by way of example only, with reference to the accompanying drawings, in which.

DEFINITIONS

Figure 1:
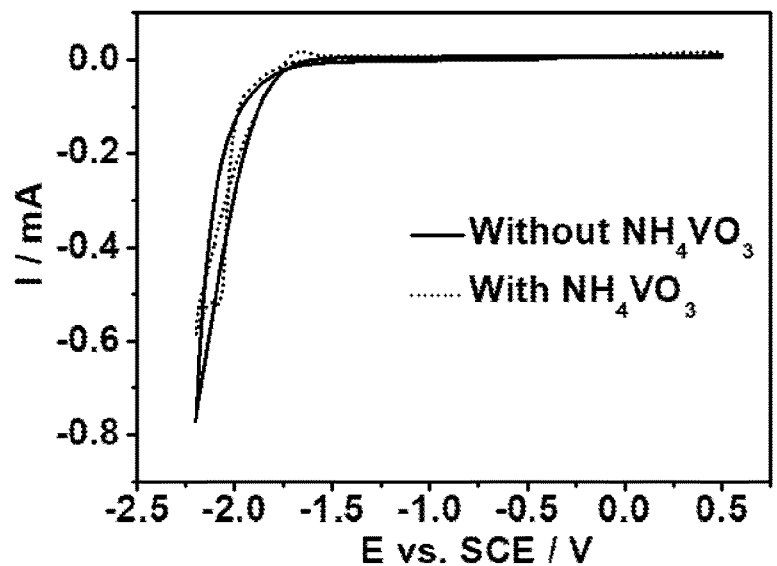
FIG. 1 shows cyclic voltammetry curves on a fluorine-doped tin oxide (FTO) substrate immersed in a solution with or without ammonium metavanadate.

As used herein, the term "water-splitting" relates to any process that generates elemental hydrogen or oxygen from water as the starting material. The water-splitting processes described herein are electrolytic in nature. These electrolytic processes typically involve the hydrogen evolution reaction (HER) at the cathode and the oxygen evolution reaction (OER) at the anode.

As used herein and in the appended claims, the singular forms "a," "an," and "the" include plural reference(s) unless the context clearly dictates otherwise. Thus, for example, a reference to "a surface" may include a plurality of surfaces or may be a reference to one or more surfaces, and so forth.

Unless defined otherwise, all technical and scientific terms used herein have the same meanings as commonly understood by one of ordinary skill in the art to which this invention belongs. It will be appreciated that any materials and methods similar or equivalent to those described herein can be used to practice or test the invention; the best-known embodiments of the various materials and methods are described.

The term "(5)" following a noun contemplates the singular or plural form, or both.

The term "and/or" can mean "and" or "or".

Unless the context requires otherwise, all percentages referred to herein are percentages by weight of the material.

Various features of the invention are described with reference to a certain value, or range of values. These values are intended to relate to the results of the various appropriate measurement techniques, and therefore should be interpreted as including a margin of error inherent in any particular measurement technique. Some of the values referred to herein are denoted by the term "about" to at least in part account for this variability. The term "about", when used to describe a value, may mean an amount within ±25%, ±10%, ±5%, ±1% or ±0.1% of that value.

The term "comprising" (or variations such as "comprise" or "comprises") as used in this specification, except where the context requires otherwise due to express language or necessary implication, is used in an inclusive sense, i.e. to specify the presence of the stated features but not to preclude the presence or addition of further features in various embodiments of the invention.

DETAILED DESCRIPTION

The invention provides a hydrogen evolution reaction (HER) catalyst comprising a catalytic metal species and a vanadium species, wherein the catalytic metal species and the vanadium species are interspersed within the catalyst.

Surprisingly, interspersed vanadium and metal catalyst species improve the HER catalytic activity of the material. Further, the HER catalyst was shown to be stable in alkaline and neutral electrolytes, even under prolonged electrolysis conditions. The HER catalyst of the invention may advantageously provide a low-cost and highly active cathode material for water-splitting on an industrial scale.

The metal catalyst species and vanadium species are interspersed within the HER catalyst. In some embodiments, the metal catalyst species and the vanadium species are contained within particles. In some embodiments, the distribution of metal catalyst species and vanadium species is substantially even throughout the HER catalyst. The distribution and/or disbursement of the various atoms contained within the HER catalyst may be determined by TEM-EDS mapping. For example, in one embodiment of the invention described in Example 1 that comprises a nickel and copper alloy as metal catalyst species and vanadium oxide as vanadium species, the nickel, copper, vanadium and oxygen atoms are substantially evenly interspersed throughout the HER catalyst.

Earlier reports of the preventive effect of vanadium on nickel-catalysts describe the formation of a vanadium deposit across the cathodic surface. However, in the present invention, the vanadium species and the metal catalyst species are interspersed within the HER catalyst. By interspersing the vanadium species and the metal catalyst species, not only can passivation of the catalytic metal species be impeded, but the HER catalytic activity may also be increased. The increase in catalyst activity is demonstrated by the associated reduction in overpotential to reach a desired current density.

The theoretical potential for electrolysis of water for an electrode relative to a reversible hydrogen electrode (RHE) is 1.23V. Any excess potential over this theoretical limit that is required to drive water electrolysis by a given electrode is referred to as an overpotential ($\eta$). The HER catalyst of the invention requires extremely low overpotentials relative to RHE.

In some embodiments, for the HER catalyst of the invention to provide a current density of 10 mA cm$^{-2}$ requires an overpotential of about 5 mV to about 50 mV, for example, about 5 mV to about 30 mV, or about 8 mV to about 30 mV. In alkaline conditions, the overpotential for the HER catalyst of the invention relative to RHE may be from about 5 mV to about 14 mV to provide a current density of 10 mA cm$^{-2}$. In neutral conditions, the overpotential for the HER catalyst of the invention relative to RHE to provide a current density of 10 mA cm$^{-2}$ may be from about 10 mV to about 50 mV, for example, from about 15 mV to about 40 mV or about 20 mV to about 35 mV. For comparison, for existing commercial Pt/C (20%) electrodes, the overpotential required to achieve a current density of 10 mA cm$^{-2-}$ is about 5 mV to about 20 mV.

In some embodiments, for the HER catalyst of the invention to provide a current density of 100 mA cm$^{-2}$ requires an overpotential of about 15 mV to about 200 mV, for example, from about 20 mV to about 150 mV or about 30 mV to about 140 mV. In alkaline conditions, the overpotential for the HER catalyst of the invention relative to RHE may be from about 15 mV to about 100 mV to provide a current density of 100 mA cm$^{-2}$, for example, about 15 mV to about 44 mV, or about 25 mV to about 44 mV or about 35 mV to about 44 mV. In neutral conditions, the overpotential for the HER catalyst of the invention relative to RHE to provide a current density of 100 mA cm$^{-2}$ may be from about 50 mV to about 200 mV, for example, from about 50 mV to about 180 mV or about 100 mV to about 150 mV. For comparison, for existing commercial Pt/C (20%) electrodes, the overpotential required to achieve a current density of 100 mA cm$^{-2-}$ is about 10 mV to about 50 mV.

The HER catalyst comprises a catalytic metal species. The catalytic metal species comprises an active catalyst species. Any metal species capable of catalyzing HER may be employed as the active catalyst species. In some embodiments, the catalytic metal species consists of the active catalyst species.

In some embodiments, the active catalyst species is a transition metal species, preferably a first row transition metal. The active catalyst species may be an Earth abundant metal species, such as any metal species other than Re, Ru, Os, Rh, Ir, Pd, Pt, Ag and Au, capable of catalysing HER.

In specific embodiments, the active catalyst species is selected from nickel (Ni) and cobalt (Co). The nickel and/or cobalt may be alloyed with any other metal species that does not significantly diminish the catalytic activity of the HER catalyst.

Typically, the active catalyst species is in metallic form. Thus, the oxidation state of the active catalyst species is typically zero. However, in some embodiments, the active catalyst species may be included in a non-metallic form, such as in the form of an oxide, sulfide or salt.

The catalytic metal species typically is provided in crystalline form. The rigid, organized structure of crystalline metals is believed to further enhance the catalytic activity of the HER catalyst. Crystal morphologies with high surface area are preferred, such as crystalline nanoparticles.

The HER catalyst also comprises a vanadium species. Any vanadium species capable of impeding passivation of the catalytic metal species may be used.

In some embodiments, the vanadium species is a vanadium oxide, such as vanadium (II) oxide ($VO_2$), vanadium pentoxide ($V_2O_5$), or a hydrate of $VO_{1.95}$.

Vanadium species are not capable of catalyzing HER on their own. It is believed that the presence of the vanadium species in the HER catalyst influences the properties and morphology of the metal catalyst species to impede its passivation and increase its catalytic activity.

The molar ratio of vanadium species to active catalyst species in the HER catalyst may be not more than about 20%. For example, the molar ratio of vanadium species to active catalyst species may be not more than about 15%, about 12%, about 10%, about 8%, about 7%, about 6%, about 5%, about 4%, about 3%, about 2%, about 1.7% or less. The minimum amount of vanadium species present in the HER catalyst may be any amount above the detection limit of the vanadium species, for example, by inductively coupled plasma optical emission spectroscopy (ICP-OES). In some embodiments, the molar ratio of vanadium species to active catalyst species may be at least about 0.1%. For example, the minimum molar ratio of vanadium species to active catalyst species may be at least about 0.5%, about 1%, about 1.5% or about 2%. The molar ratio of vanadium species to active catalyst species may be from any of these minimum amounts to any of the molar ratios mentioned above, for example, from 0.1% to 20%, 1.5% to 12% or 2% to 10%.

In some embodiments, the metal catalyst species further comprises a metal modifier. Without wishing to be bound by theory, it is believed that inclusion of the metal modifier within the metal catalyst species affects the metallic character of the active catalyst species. Ideally, the active catalyst species will have a metallic character that balances its relative binding affinity for the water reactant and hydrogen reaction product. Too high a binding affinity for the HER products leads to lower catalytic activity. The inclusion of the metal modifier may therefore assist in optimizing the metallic character of the active catalytic species within the metal catalyst species. In some embodiments, the metal modifier may be a metal species, typically having equal or lower electronegativity than the active catalyst species. The precise selection of metal modifier therefore depends on the active catalyst species selected. For example, when the active catalyst species comprises nickel or cobalt, the metal modifier may be selected from a copper, iron, and/or manganese species.

The metal modifier may be present in the HER catalyst in any form that enables it to act as metal modifier to the active catalyst species. Typically, the metal modifier may be in the form of a metal (e.g., an alloy with the active catalyst species).

In some embodiments, the metal catalyst species comprises an alloy of the active catalyst species and metal modifier. The alloy may have a crystalline morphology.

The molar ratio of metal modifier to active catalyst species may be not more than about 25%. For example, the molar ratio of metal modifier to active catalyst species may be not more than about 24%, about 23%, about 22%, about 21%, about 20%, about 19%, about 18%, about 17%, about 16%, about 15%, about 14%, about 13%, about 12%, about 11%, or about 10.5%. In embodiments, comprising the metal modifier, the minimum molar ratio of metal modifier to active catalyst species may be at least about 0.1%, for example, at least about 0.5%, 1% or 5%. The molar ratio of metal modifier to active catalyst species may be from any of these minimum amounts to any of the molar ratios mentioned above, for example, from 0.1% to 25%, 1% to 20% or 10% to 17%.

In some embodiments, the metal catalyst species comprises nickel, nickel-copper alloy or cobalt.

In some embodiments, the metal catalyst species and the vanadium species are in the form of particles. Thus, in some embodiments, the HER catalyst comprises particles comprising the metal catalyst species interspersed with the vanadium species. Typically, the particles will adopt an ordered arrangement.

The shape of the particles will be dictated by the method of manufacture and the chemical nature of the constituent components. Accordingly, the shape of the particles is not limited. For example, when the metal catalyst species comprises a nickel and copper alloy and vanadium oxide, the particles are spherical.

The particles may be amorphous, semi-crystalline and/or crystalline. In some embodiments, the particles comprise a crystalline portion and an amorphous portion. For example, the metal catalyst species may be crystalline while the vanadium species may be amorphous within the same particle. In some embodiments, the average diameter of the nanocrystals is from about 0.1 nm to about 15 nm, such as from about 0.1 nm to about 12 nm or about 0.5 nm to about 10 nm. The smaller the particle size, the greater the surface area will be. Larger surface areas increase access of water to the active catalyst species during electrolysis.

In some embodiments, the HER catalyst may include a coating to improve long term stability and durability of the catalyst, particularly when the catalyst is to be used in an alkaline solution for a prolonged period of time. Suitable coatings include metal oxides such as chromium oxide (CrO). Coatings can be used in some cases to minimize or reduce dissolution of the vanadium species that may occur over time in alkaline conditions.

The concentration of each of the species present in the HER catalyst may be determined by inductively coupled plasma optical emission spectrometry (ICP-OES).

Also provided are catalytic materials comprising the HER catalyst described herein. The catalytic materials typically further comprise a substrate. Any suitable substrate that does not interfere with the HER catalytic activity of the HER catalyst may be employed. Suitable substrates include conductive metallic substrates (e.g. a metal substrate, such as a metal foam or metal mesh or fluorine-doped tin oxide (FTO)) and conductive non-metallic substrates (e.g. carbon fiber paper substrates). Suitable metal foams include nickel foam and copper foam. Suitable metal meshes include nickel mesh.

Also provided are electrodes comprising the HER catalyst and a conductive substrate. Any conductive substrate that does not interfere with the HER catalytic activity of the HER catalyst may be used, including those described above.

Preparative Methods

The HER catalyst and materials comprising the same may be prepared by any means known in the art provided that a vanadium species is interspersed with the metal catalyst species.

In some embodiments, the catalytic materials and/or electrodes of the invention may be prepared by a facile electrodeposition process.

Accordingly, described herein is a process for preparing a HER catalyst comprising a vanadium species interspersed with a metal catalyst species on a conductive substrate, the process comprising electrolysing a solution comprising a source of the metal catalyst species and a source for the vanadium species in a solution that is in contact with the conductive substrate. Typically, the solution is an aqueous solution.

The process typically comprises contacting the conductive substrate with a solution comprising a vanadium salt and a salt form of the metal catalyst species and applying a first voltage across the conductive substrate and a counter electrode through the solution to electrodeposit the vanadium species and metal catalyst species on the substrate such that the vanadium species is interspersed with the metal catalyst species. In some embodiments, the process is carried out in a three-electrode system comprising a working electrode comprising a conductive substrate, a counter electrode and a reference electrode and applying the first voltage between the working electrode and the reference electrode through the solution to electrodeposit the metal catalyst species and the vanadium species onto a surface of the conductive substrate. In other embodiments, process is carried out using a two-electrode system comprising an anode and a cathode comprising a conductive substrate, and applying the first voltage across the anode and the cathode through the solution to electrodeposit the metal catalyst species and the vanadium species onto a surface of the conductive substrate.

The first voltage may be about −10V to about −0.5V. The first voltage may be maintained for a period of time sufficient to electrodeposit a layer of HER catalyst onto the substrate. In some embodiments, the first voltage is maintained for a period from 1 minute to about 1 hour, for example, from about 1 minute to about 30 minutes, about 2 minutes to about 15 minutes or about 10 minutes. The electrodeposition may be carried out at room temperature.

As used herein, room temperature refers to an ambient temperature of about 20° C. to about 30° C., preferably about 25° C.

In these preparative methods, salt forms of the metal catalyst species may comprise a salt of the active catalyst species and optionally a precursor of the metal modifier, such as a salt form of the metal modifier. Accordingly, when the metal catalyst species comprises nickel as the active catalyst species, the solution may comprise a nickel salt. Similarly, when the metal catalyst species comprises cobalt as the active catalyst species, the solution may comprise a cobalt salt. Any salt form of the active catalyst species capable of electroreduction may be used. Preferably, the salts are selected from nitrate, chloride and sulfate salts or combination thereof.

The solution may comprise a salt of the active catalyst species (or "active catalyst salt") in a concentration of not more than about 1M. For example, the solution may comprise a salt of the active catalyst species in a concentration of not more than about 900 mM, about 800 mM, about 700 mM, about 600 mM or about 500 mM. The minimum concentration of active catalyst salt is the concentration necessary to electrodeposit sufficient active catalyst species onto the substrate under the applied voltage. The minimum concentration of active catalyst salt may therefore be at least about 10 mM, about 15 mM, about 50 mM, about 100 mM, about 200 mM, about 250 mM, about 400 mM or about 500 mM. The concentration of active catalyst salt may be between any of these minimum concentrations to any other concentration of the active catalyst salt described herein, such as from 10 mM to 1M or 400 mM to 600 mM.

The solution may comprise a salt of the metal modifier (or "metal modifier salt") in a concentration of not more than about 100 mM. For example, the solution may comprise a metal modifier salt in amount of not more than about 80 mM, about 70 mM, about 60 mM, about 50 mM, about 40 mM, about 30 mM or about 20 mM. When present, the minimum concentration of metal modifier salt may be about 1 mM or about 5 mM. The concentration of metal modifier salt may be between any of these minimum concentrations to any other concentration of the metal modifier salt described herein, such as from 1 mM to 80 mM or 5 mM to 20 mM.

The molar ratio of metal modifier to active catalyst species in the HER catalyst may be controlled by selecting appropriate concentrations of the respective precursors in the solution prior to electrodeposition. In some embodiments, the metal modifier may be selectively removed from the metal catalyst species by a further electrolysis step. Without wishing to be bound by theory, it is thought that the active catalyst species is kinetically stabilized in the electrodeposited material through interactions with the vanadium species and the metal modifier. In addition, it is also believed that at least partial removal of the metal modifier may further increase the HER catalyst surface area, as the regions occupied by the metal modifier prior to selective removal become accessible to water during water-splitting electrolysis. Further, it is believed that the metallic character of the active metal species is not significantly affected by removal of the metal modifier after composite formation. Accordingly, in some embodiments, the process comprises selective removal of the metal modifier from the metal catalyst species, typically by applying a second voltage across the conductive substrate in contact with the solution. The second voltage may be an anodic potential of about 0.4V to about 1V, for example, about 0.6V. The second voltage may be maintained for a period of time sufficient to remove the desired amount of metal modifier. The second may be maintained for a period of about 1 minute to about 30 minutes, for example, from about 200 seconds to about 600 seconds. The electrolytic selective removal of metal modifier may be carried out at room temperature.

The solution comprises a precursor of the vanadium species (or "vanadium precursor"). Any soluble vanadium source may be used; however, typically the precursor of the vanadium species is a vanadium-containing salt, such as ammonium vanadate ($NH_4VO_3$), vanadium oxide ($V_2O_5$) or sodium vanadate ($NaVO_3$).

The solution may comprise the vanadium precursor in a concentration of not more than about 50 mM, about 40 mM, about 30 mM, about 25 mM, about 20 mM, about 15 mM or about 10 mM. The minimum concentration of vanadium precursor may be at least about 0.01 mM, about 0.1 mM, about 1 mM or about 2 mM. The concentration of vanadium precursor may be between any of these minimum concentrations to any other concentration of the vanadium precursor described herein, such as from about 0.1 mM to about 50 mM, about 1 mM to about 25 mM or about 2 mM to about 15 mM. The relative concentration of vanadium precursor and active metal catalyst salt may be selected to provide the desired molar ratio of vanadium species to active catalyst species.

The solution typically has an acidic pH (i.e. less than pH 7). Accordingly, the solution may comprise an acid. The concentration of acid may be about 100 mM to about 1M, for example, from about 250 mM to about 750 mM or about 500 mM. Suitable acids include boric acid ($H_3BO_3$), hydrochloric acid (HCl), sulfuric acid ($H_2SO_4$), nitric acid ($HNO_3$) and ammonium ions (e.g. $NH_4Cl$ or $NH_4Br$) and combinations thereof.

The solution may further comprise one or more electrolytes. Suitable electrolytes include salts, such as metal nitrate, metal sulfate and/or metal chloride salts. Typically, the metal of the electrolyte salts will correspond to one or more of the metal(s) included in the HER catalyst. The electrolyte may be present in a concentration of about 1 M.

In some embodiments, the process further comprises a substrate pretreatment step, where the substrate is washed with a strong acid (such as 4M HCl) and ultrasonicated. The pretreatment step typically removes oxides and other impurities from the substrate surface prior to electrodeposition of the HER catalyst.

In some embodiments, the process also involves the inclusion of a reference electrode in the electrolysis cell and which is also in contact with the solution. Suitable reference electrodes include Ag/AgCl, reference hydrogen electrodes, $Ag/Ag_2SO_4$ electrodes, Calomel electrodes, $Hg/Hg_2SO_4$ electrodes and Hg/HgO electrodes. In particular embodiments, the reference electrode, when used, is an Ag/AgCl electrode.

The conductive substrate may be fluoride-doped tin oxide (FTO), stainless steel, a metal foam, such as a nickel foam or copper foam, a metal mesh, such as nickel mesh or copper mesh, or a non-metallic conductive substrate, such as carbon fiber paper (CFP) or carbon cloth. Following electrodeposition, the conductive substrate may possess a mass loading of HER catalyst of about 1 $mg/cm^2$ to about 50 $mg/cm^2$.

In some embodiments, the HER catalyst may be coated with a metal oxide. For example, a NiCuVOx containing electrode prepared on a substrate, such as on a nickel foam, may be immersed in a solution of metal salt. Upon removal from the solution, the electrode is vacuum-dried and annealed at high temperature in an inert atmosphere, followed by cooling. In one example, a NiCuVOx electrode on a nickel foam was coated with chromium oxide by immersion in a solution of chromium (III) sulfate solution (10 mL, 0.005 M) for 1 minute. The electrode was removed from the solution, vacuum-dried and annealed in an Ar atmosphere at 350° C. for 2 hours, with a ramping rate of 3° C./min. The electrode is then cooled to ambient temperature.

Methods of Use

The invention provides a method of evolving hydrogen through a water splitting process. The method is carried out in an electrochemical cell, which comprises at least two electrodes and an electrolyte solution, wherein at least one of the at least two electrodes comprises the HER catalyst of the invention. In some embodiments, the electrochemical cell is a 2-electrode system comprising an anode and a cathode comprising the HER catalyst of the invention. In other embodiments, the electrochemical cell is a 3-electrode system comprising a working electrode comprising the HER catalyst of the invention, a counter electrode and a reference electrode. The method comprises contacting water with the at least two electrodes of the electrochemical cell and applying a voltage across the at least two electrodes through the electrolyte solution. As the HER half reaction typically occurs at the cathode of a 2-electrode system or the working electrode of a 3-electrode system, the cathode or the working electrode comprises the HER catalyst of the invention. In some embodiments, the electrolyte solution is an aqueous electrolyte solution. The aqueous electrolyte solution may also be the source of the water. The electrolyte solution may have a pH of about 7 or greater, for example, a pH from about 7 to about 14. In some embodiments, when the pH is alkaline, the electrolyte solution comprises a strong base, for example, a hydroxide base such as NaOH or KOH. The electrolyte solution may also comprise a vanadium salt (such as $NH_4VO_3$), in particular when the electrolyte solution has an alkaline pH. The concentration of vanadium salt in the electrolyte solution may be up to about 50 mM, for example, from about 0.2 mM to about 25 mM.

Typically, the anode used in these methods will comprise an oxygen evolution reaction (OER) catalyst, such as Ir/C or $RuO_2$/C.

When used in these methods, the HER catalyst of the invention provides improved catalytic activity to the present leading HER catalysts. Surprisingly, the HER catalysts are able to provide this improved catalysis while using Earth-abundant metals. Also, surprisingly, the HER catalyst is able to provide improved catalytic activity and require a lower overpotential to other known Earth-abundant metal-based HER catalysts, including corresponding Ni or Co-based systems. Further, the HER catalyst of the invention is surprisingly stable and active under neutral and alkaline electrolysis conditions.

In some embodiments, the method of evolving hydrogen proceeds with a Tafel slope of up to 50 mV dec$^{-1}$, for example up to 45 mV dec$^{-1}$, 30 mV dec$^{-1}$ or about 25 mV dec$^{-1}$.

Normally, the HER kinetic models suggest that the Volmer, Heyrovsky or Tafel reaction will be the rate-determining step for a Tafel slope of about 120, 40, or 30 mV dec$^{-1}$, respectively.

The voltage applied across the anode should be selected to match or exceed the overpotential for the HER catalyst in order to drive HER.

Also provided is an electrolyser comprising an anode and a cathode, a power supply and optionally a reference electrode. Typically, the cathode comprises the HER catalyst of the invention. In some embodiments, the power supply provides electricity generated from a low carbon intensive power source. The power source may be a renewable power source, for example, one or more solar panels or wind turbines, or a non-renewable power source, for example, a nuclear reactor.

EXAMPLES

The invention will be further described by way of non-limiting example(s). It will be understood to persons skilled in the art of the invention that many modifications may be made without departing from the spirit and scope of the invention.

Example 1—Nickel-Based Catalysts

Material Synthesis

Preparation of NiCuVOx electrodes. All electrodepositions were carried out in a standard three-electrode electrochemical setup. The electrodeposition of NiCuVOx catalyst onto a nickel foam (NF) or fluorine-doped tin oxide (FTO) substrate was achieved by using NF or FTO as the working electrode, a graphite plate as the auxiliary electrode, and saturated calomel electrode (SCE) as reference electrode. Prior to deposition, the nickel foam was first ultrasonicated in 5M HCl solution for 20 min to remove the NiO layer, rinsed subsequently with water and ethanol, and then dried in air. The electrodeposition and selective dealloying solution was composed of 500 mM $NiSO_4$, 8 mM to 32 mM $CuSO_4$, 8 mM $NH_4VO_3$ and 500 mM $H_3BO_3$. The electrodeposition was conducted with a CHI 660D electrochemical workstation (CH Instrument) at room temperature. First, the NiCuVOx films were electrodeposited onto the surface of NF at −2.0V (versus SCE) for 600 s. Optionally, followed by selective dissolution of Cu from the NiCu films by applying an anodic potential of 0.6V for 200 s to 600 s at room temperature to the cell.

Preparation of VOx and NiVOx electrodes. VOx and NiVOx electrodes were prepared by the same method described above for the NiCuVOx electrode. For VOx deposition on FTO, all other conditions are the same but with the precursor of 8 mM $NH_4VO_3$ and 500 mM $H_3BO_3$ onto the surface of NF at −2.0V (versus SCE) for 600 s. For NiVOx deposition, the electrolyte contains 500 mM $NiSO_4$, 8 mM $NH_4VO_3$ and 500 mM $H_3BO_3$ and deposited onto the surface of NF or FTO at −2.0 V (versus SCE) for 600 s.

Preparation of Ni and NiCu electrodes. For Ni deposition, the electrolyte contains 500 mM $NiSO_4$ and 500 mM $H_3BO_3$ and deposited onto the surface of NF or FTO at −2.0V (versus SCE) for 600 s. For NiCu deposition, the electrolyte contains 500 mM $NiSO_4$ 16 mM $CuSO_4$, and 500 mM $H_3BO_3$ and deposited onto the surface of NF or FTO at −2.0V (versus SCE) for 600 s.

Chronopotentiometry Experiments

Figure 10:
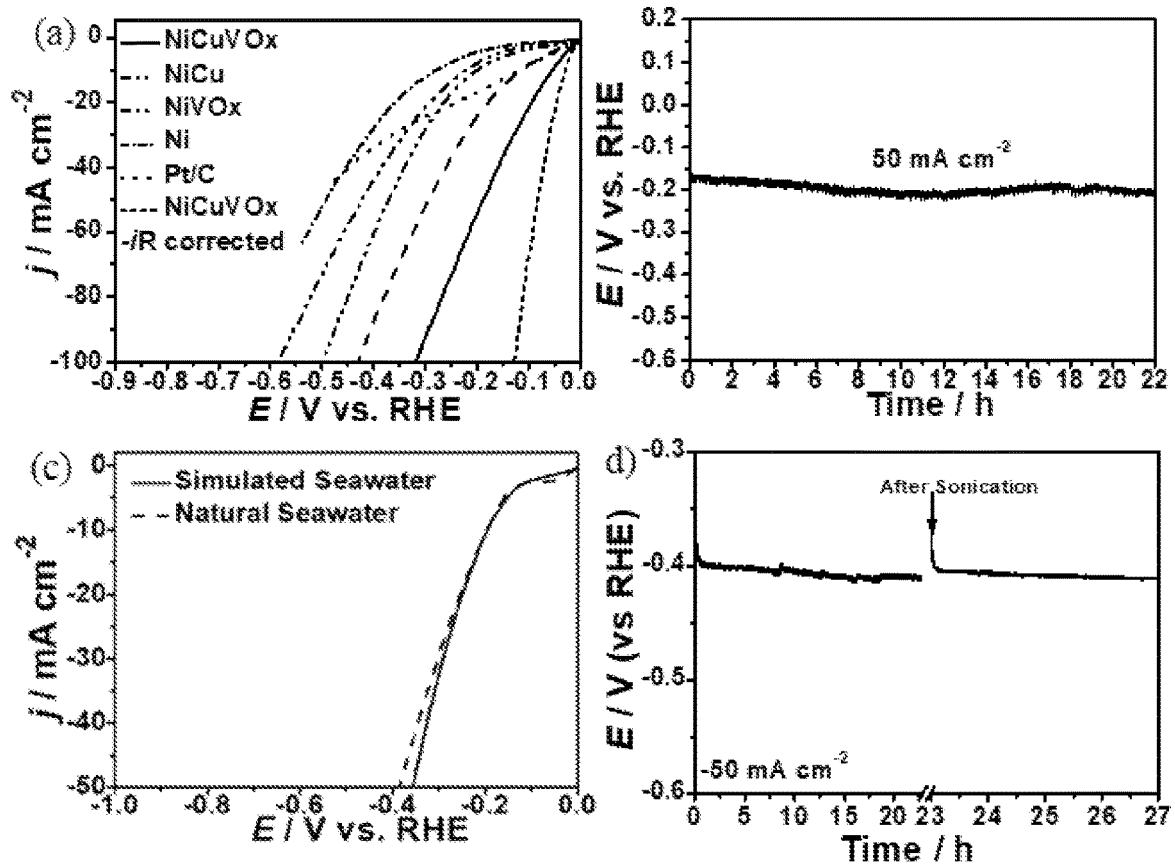
FIGS. 10a-d show (a) LSV curves for NiCuVOx and controlled samples in 1.0 M pH=7 phosphate buffer solution without iR compensation, the black dotted curve is the NiCuVOx with iR correction; (b) chronopotentiometric curve of NiCuVOx at current density of 50 mA cm$^{-2}$ in 1.0M pH=7 phosphate buffer solution; (c) LSV curves for NiCuVOx in simulated and natural seawater; and (d) chronopotentiometric curve of NiCuVOx in seawater.

In a three-electrode system (NiCuVOx as working electrode, graphite plate as reference electrode, and SCE as reference electrode) a constant current density of 50 mA cm$^{-2}$ in a 1 M PBS neutral solution was maintained for 20 h. The results of this experiment are shown in FIG. 10b.

A further experiment was carried out by increasing the current density from 10 mA cm$^{-2}$ to 500 mA cm$^{-2}$ in a 30 wt % KOH electrolyte at 80° C. in a two-electrode system by using NiCuVOx as cathode and commercial Ni as anode (results are shown in FIG. 11a). In addition, using the same set-up cell, the long-term stability of the HER catalyst was assessed over 10 hours by running at a current density of 300 mA cm$^{-2}$ first and then 10 cycles of start-up and shutdown at the same current density of 300 mA cm$^{-2}$ (FIG. 11b).

Characterisation Techniques

X-ray diffraction spectroscopy (XRD). XRD measurements were performed with PANalytical X'Pert Empyrean instrument equipped with standard Cu anode, K-α wavelength=1.54 nm. The typical scan range was 10° to 80°, collected with step size of 0.039° s$^{-1}$.

X-ray photoelectron spectroscopy (XPS). XPS measurements were performed with Thermo ESCALAB250i X-ray photoelectron spectrometer, to ensure the results consistency the scan was performed at 4 different spots.

Raman spectroscopy. Raman spectra analysis, Renishaw in Via Raman microscope equipped with 514 (green) Ar-ion laser with 1800 l mm$^{-1}$ was used. All the Raman samples were catalysts supported on CFP.

Transmission electron microscopy (TEM). TEM was carried out with Phillips CM 200 microscope. To prepare TEM samples, the nickel foam (NF) supported catalyst was transferred to Cu-grid by physically scratching the electrode using a sharp knife. The resulting powder was dispersed in absolute ethanol by ultrasonication for 15 mins. The resulting mixture was then drop-casted onto Cu-grid and dried in room temperature.

High resolution transmission electron microscopy (HR-TEM). HRTEM was carried out with Phillips CM 200 microscope. To prepare HRTEM samples, the NF supported HER catalyst was transferred to Cu-grid coated with holey carbon by sonication of the sample off the NF in absolute ethanol for 15 mins. The resulting mixture was then drop-casted onto Cu-grid and dried in room temperature.

Scanning electron microscopy. SEM analysis were carried out with JEOL F7001 with a 17 kV accelerating voltage.

Optical microscopy. Microscopy images were taken with Nikon eclipse LV100POL.

X-ray absorption near edge structure (XANES) and extended X-ray absorption fine structure (EXAFS). XANES and EXAFS were recorded on the multiple wiggler XAS beamline 12 ID at the Australian Synchrotron.

Inductively coupled plasma optical emission spectroscopy (ICP-OES). The ICP-OES was carried out on a Perkin Elmer Optima 7300 DV inductively coupled plasma optical emission spectroscope by dissolving the sample in aqua regia acid in a 10 mL solution prior to analysis.

Results and Discussion

Successful vanadium composite deposition is confirmed by cyclic voltammetry and an observed colour change of the FTO before and after electrodeposition. As shown in the cyclic voltammogram (CV) shown in FIG. 1, the absence of vanadium precursor results in no obvious redox peaks, suggesting that no electrochemical reaction occurs. However, in the presence of vanadium ions, an obvious reduction peak in the CV emerges at −2.0V, which is believed to be due to the reduction of vanadate ions (FIG. 1).

The successful formation of vanadium doped nickel and nickel-copper alloy materials was evidenced by the difference in colour of the deposited vanadium-containing material deposited on FTO (Black) compared with the material deposited on FTO in the absence of vanadium (grey-silver).

Figure 2:
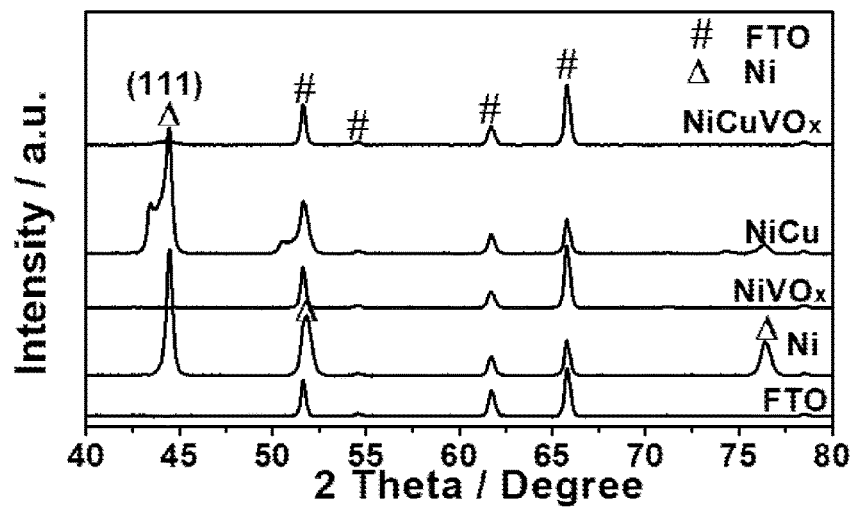
FIG. 2 shows a series of X-Ray Diffraction (XRD) diffraction patterns for various HER catalysts prepared according to Example 1 on fluorine-doped tin oxide (FTO) as substrate.
Figure 3:
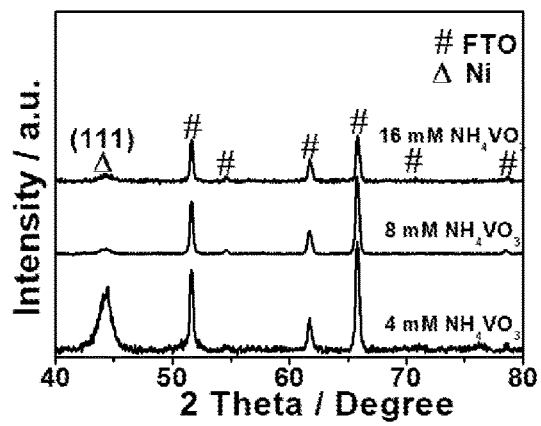
FIG. 3 shows a series of XRD diffraction patterns of NiCuVOx prepared according to the general procedure of Example 1 with different concentrations of $NH_4VO_3$ precursor.

The structures of the prepared electrodes were also characterized by X-ray diffraction (XRD) techniques. The samples deposited on FTO glass were used for XRD studies, as the NF substrate would cause interference in the diffraction pattern. As shown in FIG. 2, the XRD patterns for Ni and NiCu electrodes show three main diffraction peaks at 2θ=44.44°, 51.26° and 76.35°, which match well with the (111), (200) and (220) planes of face-centered cubic nickel (JCPDS, No. 70-0989). As for NiCu, apart from the three characteristic peaks observed for Ni, another three peak appears at the base of the Ni (111), (200) and (220) peak, indicating the formation of Ni and Cu alloy. As for the samples with the involvement of vanadium, the XRD pattern exhibits only one small and broad peak at 44.44°, indicating ultrafine Ni-liked nanocrystals (NCs) were formed when $NH_4VO_3$ was present during deposition, and the average size of the ultrafine NCs was calculated to be only ~4.65 nm according to Scherrer equation, which is much smaller than that of ~26.79 nm for pure Ni and ~19.07 nm for NiCu alloy. The molar ratio of V:Ni precursors used during electrodeposition for the formation of ultrafine Ni-liked NCs was only 1.7% (i.e. 1.7:100 moles of $NH_4VO_3$: moles of $NiSO_4$), demonstrating the strong effect of vanadium on the crystal evolution (FIG. 3). Ultrafine NCs are thought to increase the exposure of active sites for HER within the catalyst structure. To further provide more exposed active sites, Cu was selectively dealloyed using the above described anodic dissolution process. The partial Cu removal was confirmed from the decreased Cu/Ni ratio from 15.4 atom % to 10.55 atom % before and after dealloying analyzed using inductively coupled plasma optical emission spectroscopy (ICP-OES) technique (see Table 1 below). Of note, the presence of copper within the catalyst plays an important role when catalysing the hydrogen evolution reaction, which will be discussed below; however, there was no observed difference in HER catalysis between the partially removed Cu-catalyst and the catalyst prior to Cu removal. The partially removed Cu catalyst is referred to in this Example as $NiCuVO_x$.

TABLE 1

ICP-OES results for two samples of Nickel-Copper-Vanadium composites prepared according to this Example.

| # | Cu mg/l | Cu mM | Ni mg/l | Ni mM | V mg/l | V mM | Cu/Ni % w/w | Cu/Ni % mol/mol | V/Ni % w/w | V/Ni % mol/mol |
|---|---|---|---|---|---|---|---|---|---|---|
| 1 NiCuVOx before Cu removal | 6.69 | 0.105 | 40.11 | 0.683 | 1.82 | 0.0357 | 16.68% | 15.40% | 4.54% | 5.23% |
| 2 NiCuVOx after Cu removal | 4.36 | 0.069 | 38.17 | 0.650 | 0.96 | 0.0188 | 11.42% | 10.55% | 2.52% | 2.90% |

Figure 4:
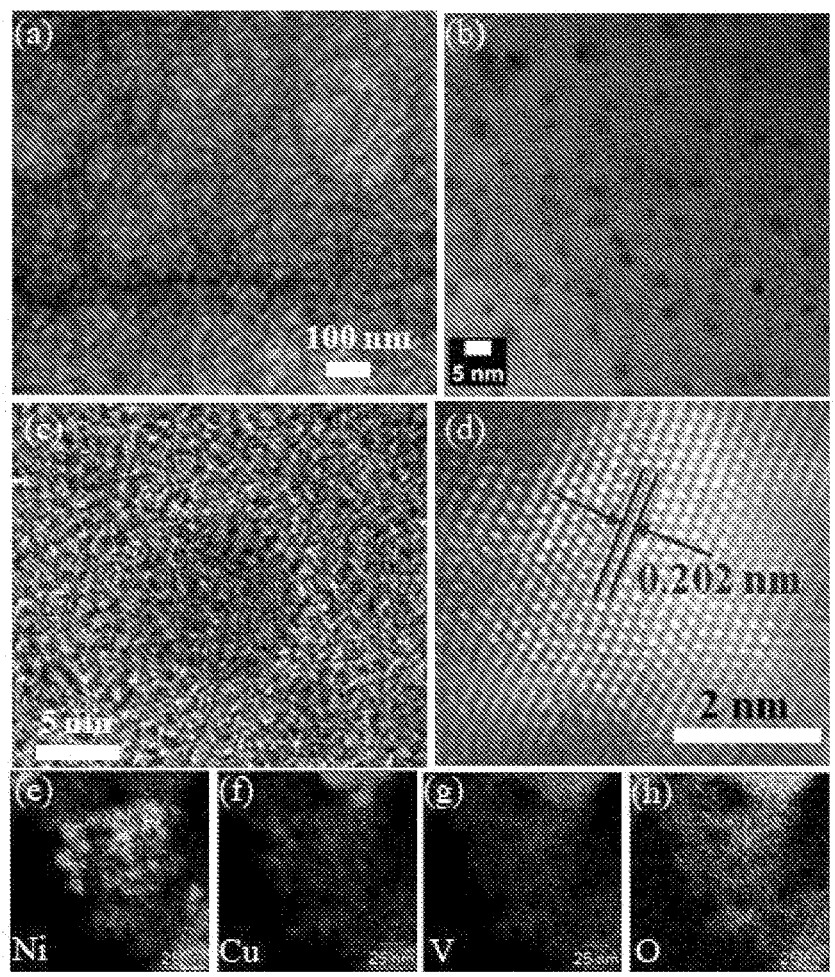
FIGS. 4a-h show (a) a scanning electron microscopy (SEM) image of a HER catalyst of the invention; (b) a transmission electron microscopy (TEM) image of the HER catalyst; (c) a high resolution transmission electron microscopy (HRTEM) image of the HER catalyst, (d) High-angle annular dark-field scanning transmission electron microscopy (HAADF-STEM) image of the HER catalyst; (e)-(h) TEM-Energy-dispersive X-ray spectroscopy (TEM-EDS) mapping images of the HER catalyst for each of Ni, Cu, V and O atoms present in the HER catalyst.
Figure 5:
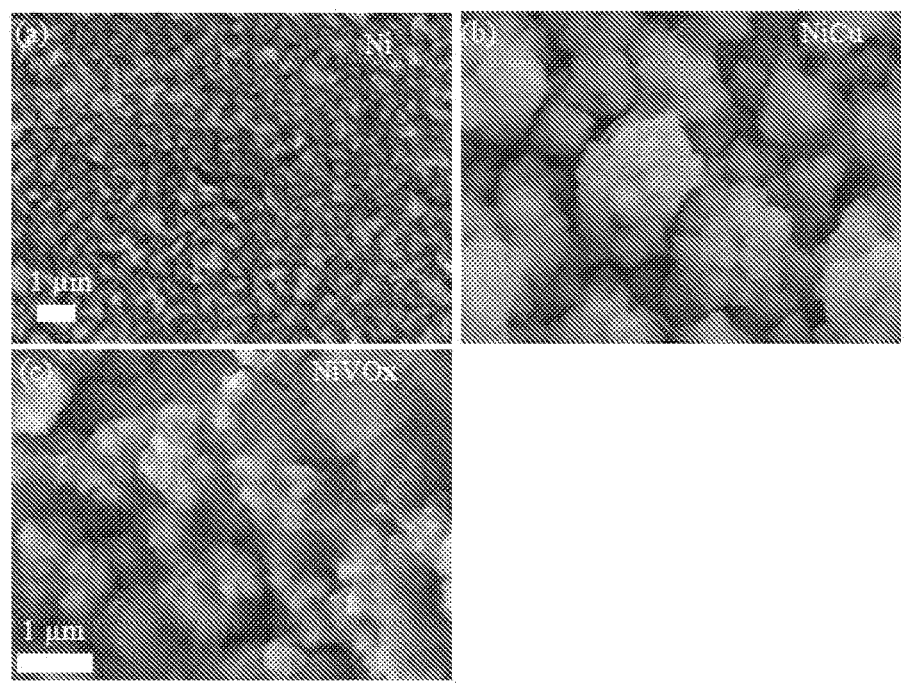
FIGS. 5a-c show SEM images for (a) Ni, (b) NiCu, (c) NiVOx electrodes prepared according to Example 1.

The electrodeposited samples with the involvement of vanadium (NiVOx, and NiCuVOx) lead to the formation of ultrafine NCs which was verified by surface morphology studies. As seen from the SEM images in FIG. 4a and FIG. 5a-c, fine NCs with a size around ~5 nm were obtained, while larger crystals were observed for Ni and NiCu, indicating the presence of vanadium in the composite plays a role in crystal grain refinement. The morphology and structure of the prepared NiCuVOx was further studied by TEM and high resolution TEM (HRTEM). The low resolution TEM clearly shows the fine crystalline structure of NiCuVOx (FIG. 4b). HRTEM examination reveals that ultrafine NiCuVOx NCs with a size of ~4-5 nm were formed (FIG. 4c), corresponding well with the XRD and SEM results. In the ultrafine NC structure of NiCuVOx, discernible and undecipherable lattice fringe coexist, meaning these NCs possess crystalline structure accompanying a substantially evenly distributed amorphous vanadium deposit. A closer investigation of the HRTEM result shows d-spacing of 0.202 nm (FIG. 4c, inset), corresponding to (111) plane of fcc Ni. The typical TEM-EDS mapping showed the uniform distribution of Ni, Cu, V and O elements (FIGS. 4e-h). For Cu, part of it has been anodically removed from the NiCu alloy, as less Cu was observed in the highly bright Ni sites.

Figure 6:
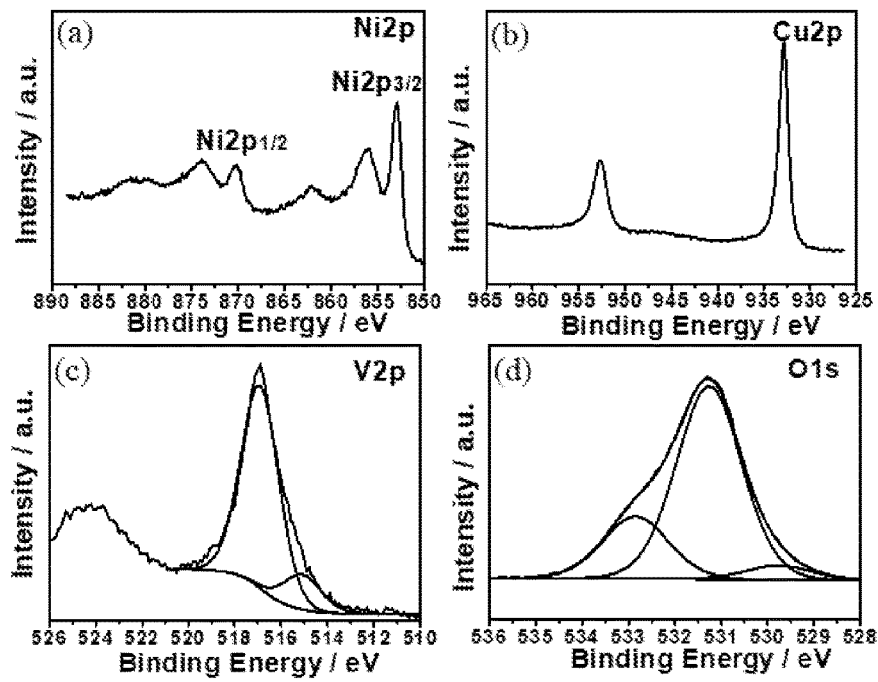
FIG. 6 shows X-ray photoelectron spectroscopy (XPS) spectra of a HER catalyst of the invention for (a) Ni2p; (b) Cu2p; (c) V2p; and (d) O1s.

The composition and the elemental oxidation states of the NiCuVOx were studied by X-ray photoelectron spectroscopy (XPS, FIG. 6a-d). For Ni2p XPS (FIG. 6a), the binding energy at 852.8 eV (Ni2p3/2 line) and 870.0 eV (Ni2p1/2 line) relate to metallic Ni, and the Ni2p peak split spin-orbit components of 17.3 eV, illustrating the formation of nickel metal in the NiCuVOx composite. FIG. 6b shows the Cu2p3/2 and the Cu 2p1/2 spectrum region of Cu at peaks 932.8 eV and 952.6 eV, respectively, with a Ni2p peak split spin-orbit components of 19.8 eV, indicating the oxidation state of copper is Cu(0) metal. The binding energies for the V2p3/2 show two peaks at 516.9 and 515.2 eV (FIG. 6c) suggest the presents of a mixed valence state of $V^{4+}$ and $V^{3+}$, with $V^{4+}$ as the dominate valence state ($V^{4+}/V^{3+}=9$), which corresponding well with the black colour of the deposited vanadium composite and indicating the successful reduction of $V^{5+}$ during electrochemical deposition. The fitting peak of O1s (FIG. 6d) at 529.7 eV is pointed to the O—V bond, the peak located at 531.2 eV position corresponds the formed vanadium oxide containing deposits and 532.9 eV can be assigned to oxygen species in the surface-adsorbed $H_2O$ molecule. According to the above results, the compound formula of electrodeposited vanadium containing composite can be written as $VO_{1.95}.xH_2O$.

Figure 7:
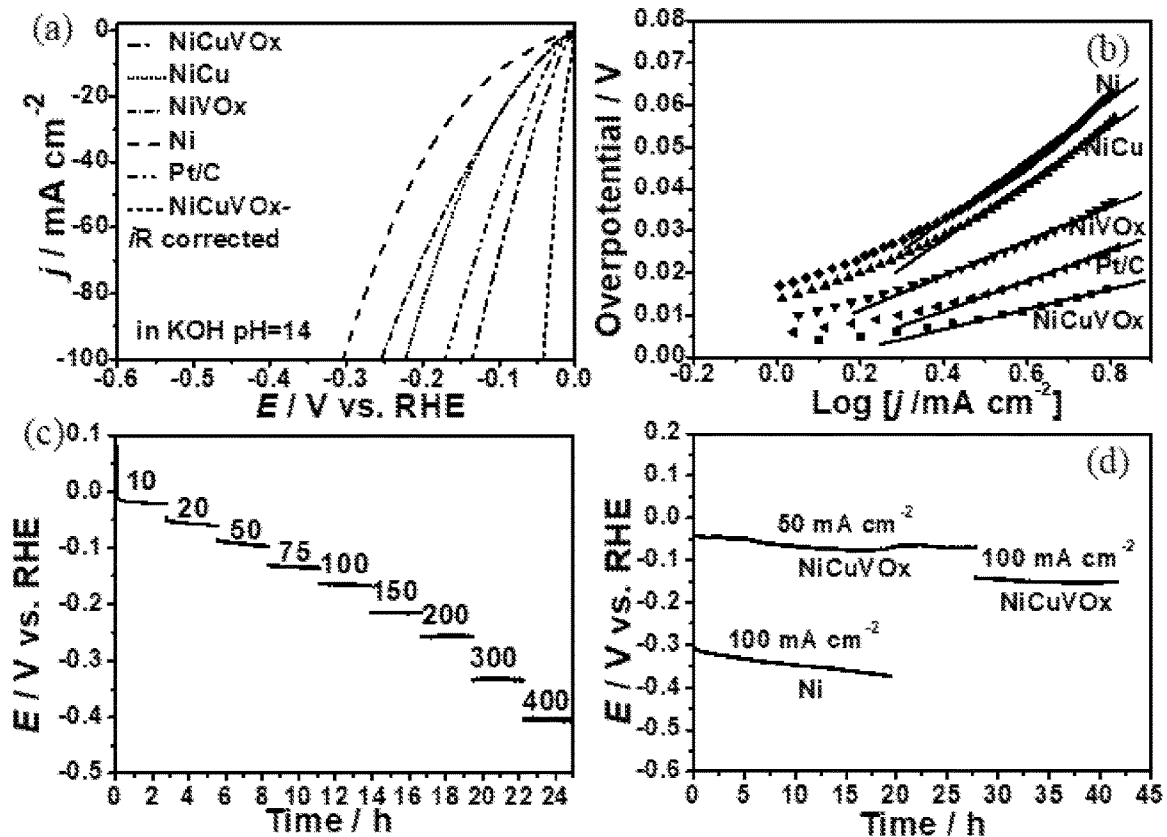
FIGS. 7a-d show (a) linear sweep voltammetry (LSV) curves for HER catalysts of the invention (NiCuVOx—as measured and internal resistance (iR) corrected—and NiVOx) compared with their non-vanadium equivalents (NiCu and Ni) and Pt/C catalysts under alkaline (1M KOH, pH=14) conditions; (b) Tafel plots for HER catalysts of the invention (NiCuVOx—as measured and internal resistance (iR) corrected—and NiVOx) compared with their non-vanadium equivalents (NiCu and Ni) and Pt/C catalysts under alkaline (1M KOH, pH=14) conditions; (c) multi-current curve of NiCuVOx; (d) chronopotentiometric curve of NiCuVOx and Ni electrodes.
Figure 8:
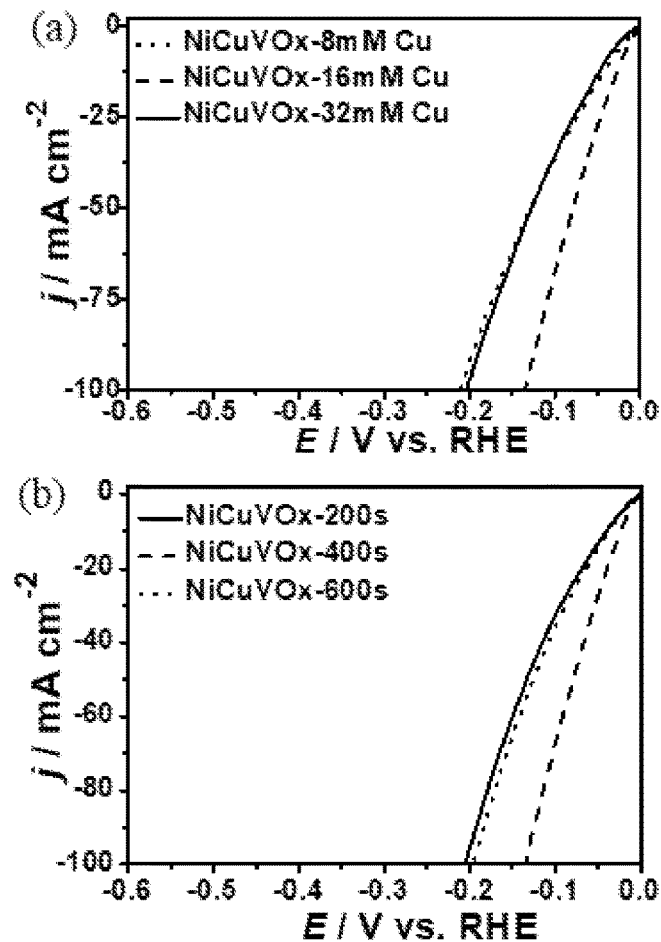
FIGS. 8a and b show LSV curves in 1 M KOH for NiCuVOx obtained at different electrodeposition conditions: (a) different amounts of Cu precursor; and (b) different anodic oxidation time.

The catalytic performance of the prepared NiCuVOx, NiCu, NiV and Ni catalysts for HER was evaluated by using the linear scan voltammogram (LSV) and chronopotentiometry techniques in various conditions including alkaline, neutral and corrosive seawater mediums. For comparison, the electrocatalytic activity of the commercially available benchmark Pt/C catalyst (20 wt % Pt on carbon black) was also measured (FIG. 7a). For NiCuVO$_x$, the optimized electrodeposition and dealloying conditions were evaluated first and it was found that a molar ratio of $Cu^{2+}/Ni^{2+}=2.5\%$ (16 mM copper) in the deposition bath and an anodic dealloying time of 400 s produces the catalyst with strongest hydrogen generation property (FIG. 8). After optimization, the catalytic activity was compared in 1.0M potassium hydroxide (KOH) and the NiCuVOx afforded nearly zero overpotential for the HER. Impressively, the NiCuVOx catalyst achieved an HER current density of 10 mA cm$^{-2}$ at only 22 mV overpotential (without iR correction), which is smaller than that of 49, 49, and 87 mV for NiVOx, NiCu and Ni, respectively. If the resistance between the electrolyte and electrode was removed (iR compensated, the black dash line in FIG. 7a), an overpotential of merely 10 mV is required to reach a current density of 10 mA cm$^{-2}$, and 42 mV required to reach a current density of 100 mA cm$^{-2}$ for the NiCuVOx catalyst. The iR corrected overpotentials for the NiVOx catalyst, are 44 mV to achieve a current density of 10 mA cm$^{-2}$ and 101 mV to reach a current density of 100 mA cm$^{-2}$.

Tafel slope is viewed as an intrinsic property of the electrode reactions, and the Tafel slope value is determined by the rate limiting step. Normally, the HER kinetic models suggest that the Volmer, Heyrovsky or Tafel reaction will be the rate-determining step for a Tafel slope of about 120, 40, or 30 mV dec$^{-1}$, respectively. The Tafel slope for NiCuVOx, NiVOx, NiCu, Ni and 20% Pt/C are 24, 45, 72, 74 and 34 mV dec$^{-1}$, respectively (FIG. 7b). The smallest Tafel slope of 24 mV dec$^{-1}$ for NiCuVOx suggests a faster increase of hydrogen generation rate with increasing overpotential applied and the Volmer-Tafel mechanism with the chemical recombination of $H_{ads}$ the rate-determining step by NiCuVOx nanoparticles at low overpotentials.

Figure 9:
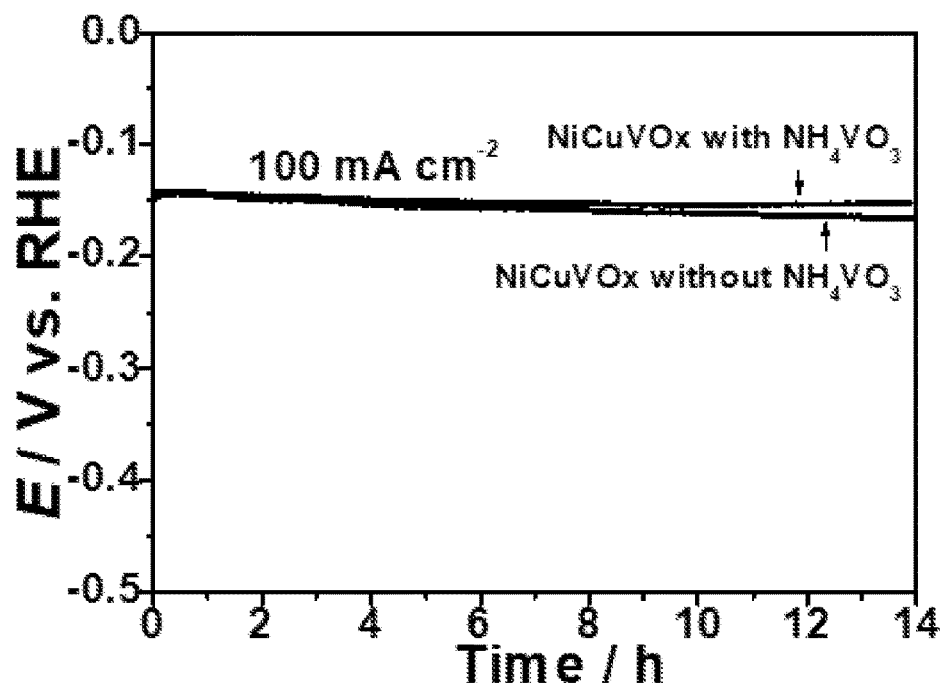
FIG. 9 shows LSV curves for NiCuVOx (Example 1) in 1 M KOH with and without $NH_4VO_3$ in the electrolyte.

Electrocatalytic stability is an important criterion for HER catalysts. Vanadium deposits (VOx; prepared by electrodeposition) on FTO were first tested for stability by immersing them into electrolyte solutions (1M phosphate buffered saline (PBS) solution and 1M potassium hydroxide). The FTO substrate was selected due to its transparency. VOx deposited on FTO can be submersed in the neutral 1M PBS solution for in excess of 6 months without any visual change, whereas the black-coloured VOx deposited on FTO immersed in 1M KOH becomes colourless over time, suggesting that under alkaline conditions the vanadium deposit dissolves. Further, under alkaline conditions, NiCuVOx has been found to slightly lose HER activity under a constant current density in alkaline electrolyte (FIG. 9) over extended periods of time. This phenomenon can be further evidenced from the weak XPS V2p signals detected after long-term stability in alkaline, meaning the deposited vanadium oxide, at least at the surface, was almost dissolved into the solution. But, this issue can be solved by adding $NH_4VO_3$ into the KOH solution (FIG. 9). As seen from FIGS. 7c, d and 9, the NiCuVOx electrode shows excellent stability and mass transfer property in either multi-current test conditions or long-term stability at both low (50 mA cm$^{-2}$) and high current densities (100 mA cm$^{-2}$) with $NH_4VO_3$ inclusion in the electrolyte, which is in stark contrast with the poor stability of Ni electrode measured under the same conditions. The NiCuVOx exhibits excellent long-term electrochemical robustness without the existence of the $NH_4VO_3$ in neutral solutions, as evidenced by its stable overpotential of around 190 mV to reach 50 mA cm$^{-2}$ for more than 20 h in a chronopotentiometry experiment (FIG. 10b).

Figure 11:
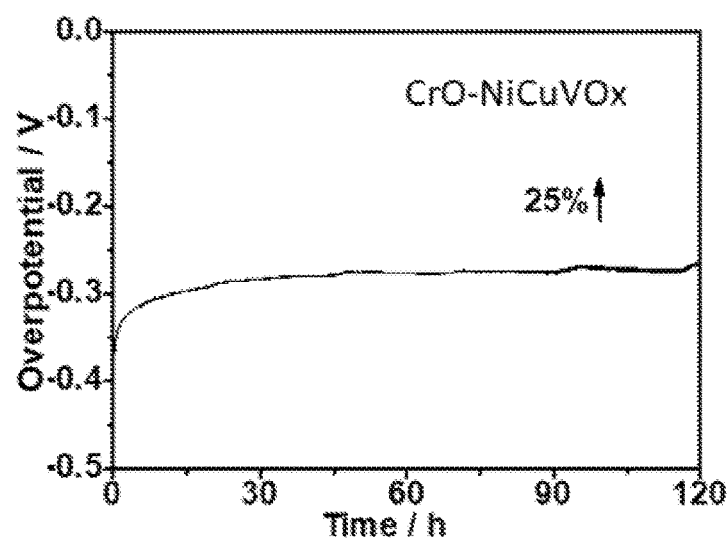
FIG. 11 shows the overpotential vs time for a chromium oxide coated NiCuVOx electrode showing stability and durability.

Furthermore, the dissolution issue of VOx in alkaline on the influence of the long-term stability can also be solved by coating a layer of amorphous chromium oxide onto NiCuVOx (named as: CrO-NiCuVOx)). As shown in FIG. 11, with the prolonged hydrogen evolution reaction (HER) stability testing, there is a continuous HER activity increment before stabilizing and the activity increased ~25% from the beginning. The excellent durability makes it promising for practical water electrolysis application.

Existing electrochemical water splitting processes to generate hydrogen gas, use either harsh alkaline or acidic conditions. The corrosion under such harsh conditions prevents practical large-scale hydrogen production from abundant water sources such as ocean water, which is close to neutral pH. The mechanism of HER in alkaline media resembles that under neutral conditions. Therefore, the HER activity of the synthesized catalyst before and after vanadium modification were further investigated at pH=7. The prepared electrodes also serve well as electrocatalysts for hydrogen generation under neutral-pH. As shown in FIG. 10a, the NiCuVOx only requires a small overpotential of η=56 mV to reach a current density of 10 mA cm$^{-2}$, which compares favourably to the η=284 mV observed for the pure Ni electrode, η=202 mV for the NiCu electrode and η=114 for the NiVOx electrode. If iR compensation is applied, ultralow overpotentials of 28 mV at 10 mA cm$^{-2}$ or 126 mV at 100 mA cm$^{-2}$ for hydrogen evolution in pH=7 were achieved using the NiCuVOx catalyst.

At present, it is still a challenging task to generate H$_2$ based on seawater electrolysis and the main problem in the seawater environment is that most water splitting catalysts tend to be deactivated or corroded and this results in loss of efficiency. It is thus highly desirable to develop a catalyst with both high activity and stability in simulated seawater or real seawater environment. The prepared high efficiency and robust NiCuVOx electrode for hydrogen evolution was further investigated in both simulated seawater and real seawater obtained from Sydney and the South Pacific Ocean, China. Interestingly, for NiCuVOx an overpotential of 194 mV (without iR correction) was required to reach a current density of 10 mA cm$^{-2}$ under both simulated seawater and real seawater conditions (FIG. 10c), which compares favourably to other reported catalysts under similar conditions. The long-term stability test shows slightly degraded catalytic activity in seawater (FIG. 10d); however, it is believed that this degradation was due to the continuous precipitate formation during the reaction, where a white precipitate forms at the electrode surface during electrolysis. It is believed that precipitate formation was due to the complex composition of sea water which comprises Na, Ca and Mg salts. However, these white deposits were easily removed by sonication and the high catalytic activity of the catalyst was restored following precipitate removal, demonstrating the robustness of the NiCuVOx electrode.

Figure 12:
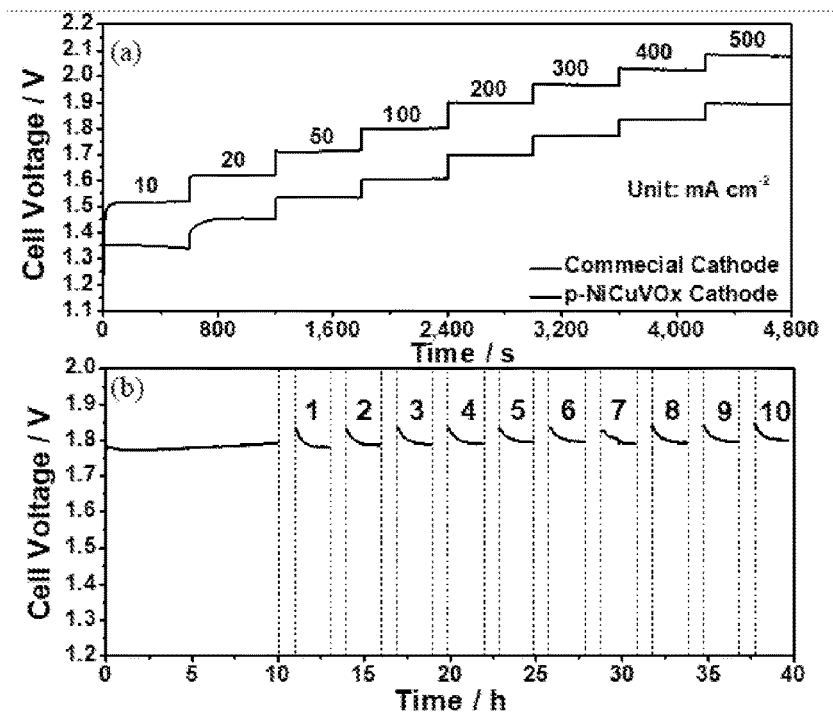
FIGS. 12a and b show (a) multi-current curve of NiCuVOx compared to a nickel cathode (two-electrode electrolysis) in 30 wt % KOH electrolytes with a temperature of 80° C. degrees; and (b) chronopotentiometric curve of NiCuVOx at current density of 300 mA cm$^{-2}$ and following 10 cycle power interruptions (continuous electrolysis for 1 h followed by power shut down of 0.5 h).

To further evaluate the robustness and high activity of the prepared NiCuVOx material as cathode electrode in real industrial alkaline water electrolysis which operate at high current densities (300 mA cm$^{-2}$), high electrolyte concentrations (30 wt % KOH), and high temperatures (80° C.), a two-electrode electrolytic cell was used to test the hydrogen production capability by comparing with the commercial electrode (Suzhou Jingli Hydrogen Production Equipment Co). The only difference between the cell setup to the commercial configuration was swapping the cathode with the as prepared NiCuVOx electrode on NF, but keeping the Ni on nickel mesh anode electrode unchanged. Firstly, the electrolysis activity of the NiCuVOx cathode electrode in comparison with the commercial electrode was measured under different current densities, from 10 mA cm$^{-2}$ up to 500 mA cm$^{-2}$ in a 30 wt % KOH electrolyte at 80° C. As seen in FIG. 12a, the water splitting performance is significantly improved over the performance of the commercial cathode, when the NiCuVOx electrode is used. For example, a cell voltage of only 1.35V was required to deliver a current density of 10 mA cm$^{-2}$ when NiCuVOx was used at the cathode, compared to a cell voltage of 1.52V when the commercial cathode was employed. Likewise, using the NiCuVOx cathode a cell voltage of 1.89V was required to deliver a current density of 500 mA cm$^{-2}$, compared to a cell voltage of 2.08V for the commercial cathode. The increased catalytic activity of NiCuVOx translates into an energy saving of ~10% compared with the commercial cathode. The produced hydrogen evolved from the NiCuVOx cathode in the electrochemical cell was quantified via gas chromatography and a nearly 100% Faradaic efficiency was gained.

An important goal for all electrolysis processes is the developments of catalysts which can withstand long-term running and frequent/quick cell shut down/start up, as the electrodes can be depolarized and are susceptible to corrosion/deactivation owing to the reversed current during intermittent operations. Further, electrodes which can endure abrupt power supply changes is very important for use in combination with electricity generated from intermittent renewable resources such as solar and wind energy. Thus, the stability under both continuous electrolysis and intermittent electrolysis with power shut down/start up at high temperature and high current densities were tested at 30 wt % KOH electrolytes (80° C., 300 mA cm$^{-2}$; for at least ten shut down/start up cycles with a shutdown interval of 1 h). The galvanostatic curves obtained from these tests are shown in FIG. 12b. Through these tests the cell voltage remains stable at ~1.78V after each power shutdown. These results show that there is minimal change in cell potential during the harsh continuous alkaline water electrolysis operation, indicating the excellent long-term robustness of the prepared NiCuVOx electrode.

Figure 13:
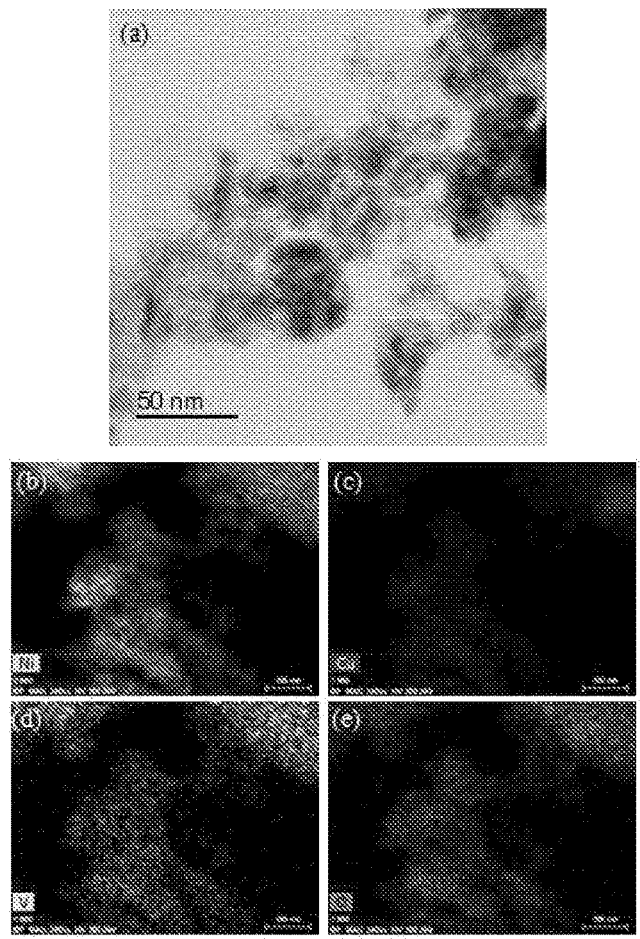
FIGS. 13a-e show (a) a TEM image of NiCuVOx (Example 1) after use as a catalyst in the chronopotentiometric experiments (results shown in FIG. 11b); and TEM-EDS mapping images of (b) Ni, (c) Cu, (d) V and (e) O after use as a catalyst for an extended period of time.
Figure 14:
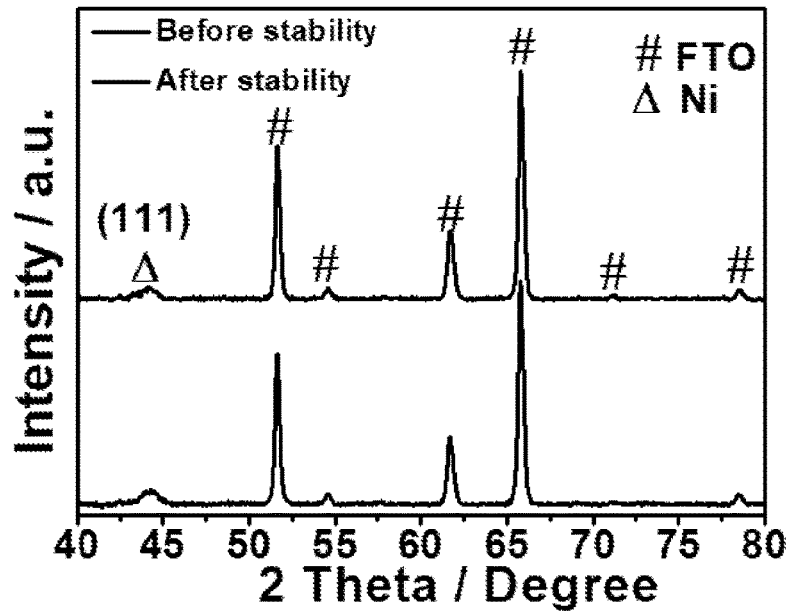
FIG. 14 shows XRD patterns of NiCuVOx (Example 1) before and after use as a catalyst for an extended period of time. Cyclic voltammetries in 1 M KOH electrolyte under various scanning rates and the relevant calculation of electrochemical surface areas (a and b: NF; c and d: CoFe/NF; e and f: CoFeCr/NF).

The stability and robustness of the NiCuVOx catalyst was further supported by repeating the characterisation studies after its use to catalyse HER. The TEM image of NiCuVOx after long-term alkaline water electrolysis shows that the catalyst retains its structure with the uniform distribution of Ni, Cu, V and O element mapping (FIG. 13). Moreover, the XRD patterns for the NiCuVOx sample after stability test perfectly match the XRD pattern before the test, with the Ni (111) peak as the sole peak, further demonstrating the stability of NiCuVOx as a cathode material (FIG. 14).

Figure 15:
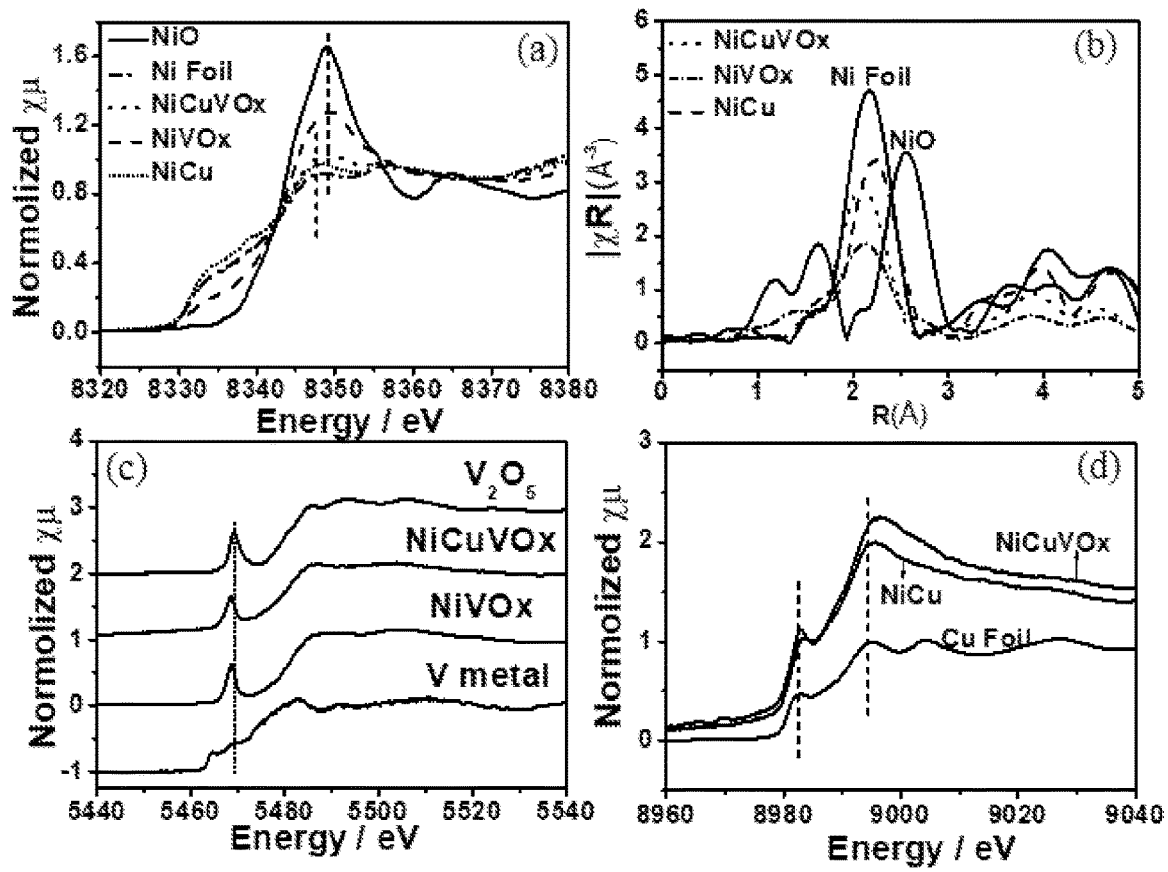
FIGS. 15a-d show (a) a K-edge X-ray Absorption Near-Edge Structure (XANES) on Ni; (b) Extended X-Ray Absorption Fine Structure (EXAFS) on Ni; (c) K-edge XANES on V; and (d) K-edge XANES on Cu.

In order to obtain further information on the elemental oxidation states and in particular to determine the influence of the deposited vanadium containing compound on HER, Ni, Cu and V K-edge XANES measurements were carried out, which is sensitive to the oxidation state of the element. FIG. 15a shows the Ni—K edge spectra of different samples and the standard NiO. All spectra show a pre-edge shoulder peak ascribed to the transition from the 1 s core level to bound unoccupied d states near the Fermi level, meaning the oxidation state of the prepared catalyst for Ni were similar with the nickel metal. However, the pre-edge position shifts toward higher energy with the existence of vanadium, while it shifts to the negative position after codeposition of Cu. This phenomenon indicates the Ni tends to show more metallic character when Cu is present, which is good for H adsorption, but the strong chemical bond of Ni—H would hinder H$_2$ desorption and thus decrease the reaction rate of HER. For NiVOx, the higher intensity of the white line peak compares with NiCuVOx and NiCu indicates Ni was in a more oxidized state, meaning the enhanced H$_2$ desorption but weakened H adsorption. Therefore, it is believed that the metal character of the Ni in the NiCuVOx material corresponds to an optimal hydrogen binding energy. For the NiCuVOx composite, the Ni pre-edge position is located between that of NiCu alloy and NiVOx, indicating a mildly oxidized Ni oxidation state was generated, which can significantly influence the catalytic activity towards water splitting, as observed in the electrochemical water splitting performance. The partial oxidation and structure disorder of Ni can also be seen from the EXAFS analysis of Ni—K edge that n decreased Ni—Ni interaction peak intensity and shorter bond length than that of Ni foil (FIG. 15b).

The vanadium K-edge was measured in the prepared catalysts. FIG. 15c shows the spectra of the NiCuVOx and NiVOx sample, along with the different valence states of the vanadium as reference samples. The pre-peak of the V K-edge is known to be a formally forbidden 1 s-3 d electronic transition and the intensity of such a pre-peak increases from perfect octahedral symmetry (VO) to distorted octahedral $VO_6$ groups ($V_2O_3$ and $VO_2$) and further to the lower coordination of the distorted square-pyramidal $VO_5$ group ($V_2O_5$). As seen from FIG. 15c, the intensity of this pre-peak both shifts to lower energy position and slight decreased intensity comparing with the $V_2O_5$ reference, which means a reduced vanadium oxidation state and the formation of $VO_2$ like structure, in accordance with the XPS results.

The Cu K-edge signal was also measured and the results are presented in FIG. 15d and metallic Cu reference is added for comparison. The spectral profiles and the position of the edge indicate that copper is close to the $Cu^0$ oxidized form.

Figure 16:
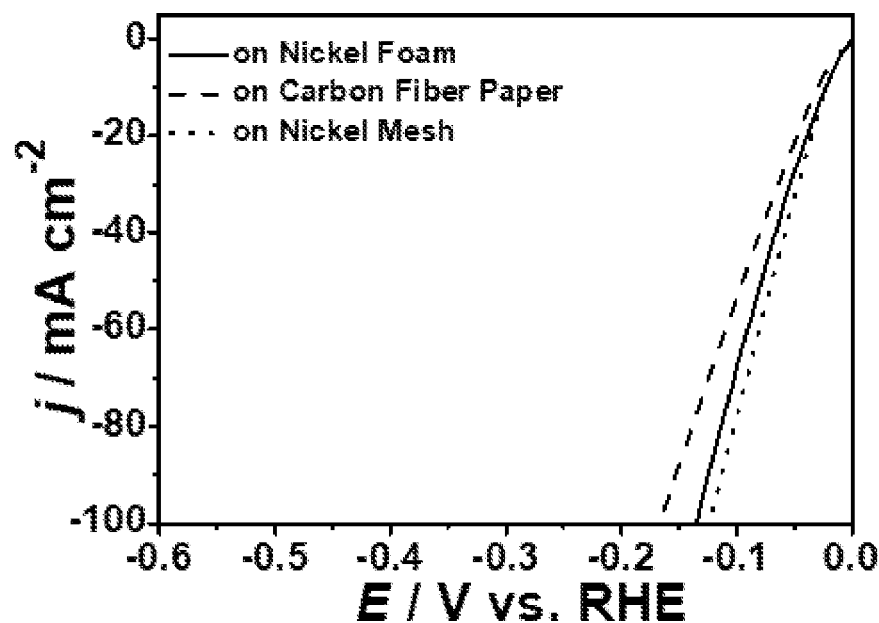
FIG. 16 shows LSV curves in 1 M KOH for NiCuVOx (Example 1) deposited on nickel foam (NF), nickel mesh and carbon fiber paper (CFP) substrates.
Figure 17:
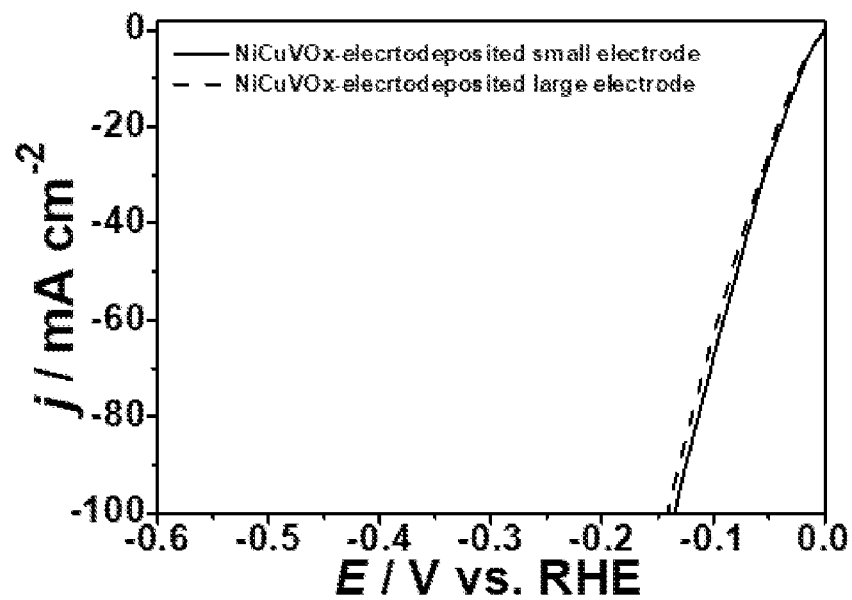
FIG. 17 shows a LSV curves comparing the activity of a HER electrode of the invention (NiCuVOx; Example 1) deposited on a 0.5 cm×0.5 cm substrate compared to a 21 cm×21 cm substrate.

The electrodeposition approach allows deposition of the electrode material on various conductive substrates including fluorine-doped tin oxide (FTO), nickel foam (NF), nickel mesh, and carbon paper fiber (CFP). Electrodes produced in this way demonstrate similar high performances (FIG. 16). The deposition process is also scalable, with successful deposition of NiCuVOx onto a large substrate with a size of 21 cm×21 cm that shows almost the same HER activity as observed for the prepared small electrode in 1M KOH (FIG. 17).

Example 2—Cobalt-Based Catalysts

Figure 18:
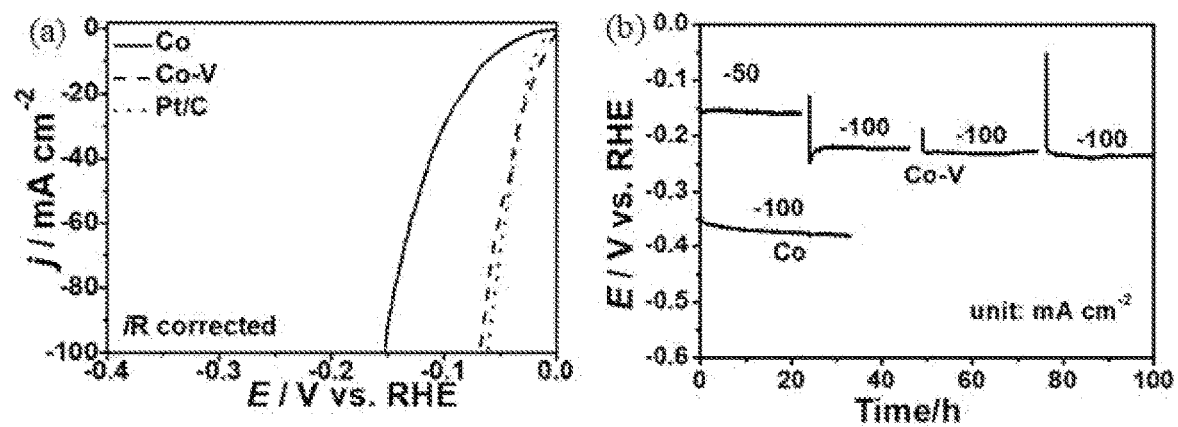
FIGS. 18a and b show (a) LSV curves of HER catalyst of the invention (Co—V; Example 2) compared with Co (Example 2) and Pt/C (iR corrected); and (b) Tafel slopes for Co—V and Co prepared according to Example 2.
Figure 19:
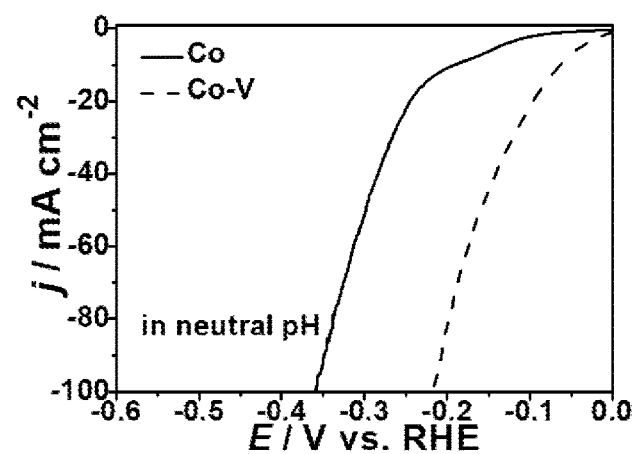
FIG. 19 shows LSV curves for Co—V and Co prepared according to Example 2 in neutral electrolyte.

Using methods similar to those described in Example 1, a cobalt catalyst doped with vanadium oxide was prepared. A reference material without the vanadium doping was prepared for comparison. Results shown in FIGS. 18 and 19 demonstrate that the vanadium-doped cobalt catalyst possesses superior HER catalytic activity over the cobalt only catalyst in both alkaline and neutral conditions. Further, under alkaline conditions, the CoV catalyst has an activity that is competitive with a commercial platinum catalyst.

CoV cathode preparation. All electrodepositions were carried out in a three-electrode electrochemical setup as described in Example 1. The electrodeposition of CoV catalyst onto a nickel foam (NF) substrate was achieved by using NF as the working electrode, a graphite plate as the auxiliary electrode, and saturated calomel electrode (SCE) as reference electrode. Prior to deposition, the nickel foam was first ultrasonicated in 5M HCl solution for 20 min to remove the NiO layer, rinsed subsequently with water and ethanol, and then dried in air. The electrodeposition electrolyte comprises 500 mM $CoCl_2$, 18 mM $NH_4VO_3$ and 500 mM $H_3BO_3$. The electrodeposition was conducted with a CHI 660D electrochemical workstation (CH Instrument) at room temperature. The CoV film was electrodeposited onto the NF substrate at −2.0V (versus SCE) for 600 s. The molar ratio of V/Co in the precursor is 3.6%.

Preparation of the cobalt on NF control sample. The Co on NF control electrode was prepared under the same conditions outlined above, with the exception of adding the $NH_4VO_3$ vanadium precursor.

The invention claimed is:

1. A hydrogen evolution reaction (HER) catalyst comprising a ternary metal oxide, wherein the ternary metal oxide comprises:
  a catalytic metal species comprising nickel and copper as active catalyst species, and
  an amorphous vanadium species, wherein the vanadium species is vanadium oxide;
  wherein the catalytic metal species and the vanadium species are interspersed within the HER catalyst.

2. The HER catalyst of claim 1, wherein the catalytic metal species and the amorphous vanadium species are contained within particles.

3. The HER catalyst of claim 2, wherein the particles possess a crystalline structure and the amorphous vanadium species.

4. The HER catalyst of claim 2, wherein the average diameter of the particles is from about 0.1nm to about 15nm.

5. The HER catalyst of claim 1, wherein the catalytic metal species comprises an alloy of nickel and copper.

6. The HER catalyst of claim 1 further comprising a metal oxide coating.

7. The HER catalyst of claim 6 wherein the metal oxide coating is a chromium oxide coating.

8. A catalytic material comprising the HER catalyst of claim 1 and a substrate.

9. A catalytic material according to claim 8 wherein the substrate is a conductive metallic substrate.

10. A catalytic material according to claim 8 wherein the substrate is a conductive non-metallic substrate.

11. A catalytic material according to claim 8 wherein the substrate is a metal foam, a metal mesh, fluorine-doped tin oxide (FTO) or carbon fiber paper.

12. An electrode comprising a conductive substrate and the HER catalyst of claim 1.

13. A process for preparing the HER catalyst of claim 1, the process comprising contacting a conductive substrate with a solution comprising a source of the metal catalyst species and a source of the vanadium species, and applying a voltage across the substrate and a counter electrode through the solution to electrodeposit the metal catalyst species and the vanadium species onto a surface of the conductive substrate.

14. A method of evolving hydrogen from water, the method comprising providing an electrochemical cell comprising at least two electrodes and an electrolyte solution, contacting water with the at least two electrodes, and applying a voltage across the at least two electrodes, wherein at least one of the at least two electrodes comprises the HER catalyst of claim 1.

15. An electrolyser comprising at least two electrodes and a power supply, wherein at least one of the at least two electrodes comprises the HER catalyst of claim 1.

* * * * *